(12) United States Patent
Nielsen et al.

(10) Patent No.: US 11,667,087 B2
(45) Date of Patent: Jun. 6, 2023

(54) DISTANCE MEMBER FOR CONNECTING WIND TURBINE BLADE SHEAR WEBS

(71) Applicants: LM Wind Power A/S, Kolding (DK); LM Wind Power R&D (Holland) B.V., DH Heerhugowaard (NL); LM Wind Power Blades (India) Pvt. Ltd., Nelamangala Taluk Bengaluru (IN)

(72) Inventors: Michael Wenani Nielsen, Kolding (DK); Pavel Zhuravlov, DH Heerhugowaard (NL); Suresh Babu Gangavaram Pandarinath, Nelamangala Taluk Bengaluru (IN)

(73) Assignees: LM Wind Power A/S, Kolding (DK); LM Wind Power R & D (Holland) B.V., DH Heerhugowaard (NL); LM Wind Power Blades (India)Private Limited, Bengaluru (IN)

( * ) Notice: Subject to any disclaimer, the term of this patent is extended or adjusted under 35 U.S.C. 154(b) by 0 days.

(21) Appl. No.: 17/563,153

(22) Filed: Dec. 28, 2021

(65) Prior Publication Data

US 2022/0203627 A1 Jun. 30, 2022

(30) Foreign Application Priority Data

Dec. 28, 2020 (IN) .......................... IN202041056682
Jan. 29, 2021 (EP) ................................... 21154219.6

(51) Int. Cl.
*F03D 1/06* (2006.01)
*B29C 65/48* (2006.01)
*B29L 31/08* (2006.01)

(52) U.S. Cl.
CPC ........ *B29C 65/4825* (2013.01); *F03D 1/0675* (2013.01); *B29L 2031/085* (2013.01); *F05B 2230/23* (2013.01); *F05B 2260/301* (2013.01)

(58) Field of Classification Search
CPC ................ F03D 1/0675; F05B 2230/23; F05B 2230/60; F05B 2230/604; F05B 2230/606;
(Continued)

(56) References Cited

U.S. PATENT DOCUMENTS

| 9,932,958 B2* | 4/2018 | Sandercock | B25B 11/00 |
| 2011/0176928 A1* | 7/2011 | Jensen | F03D 3/062 |
| | | | 416/233 |
| 2022/0307465 A1* | 9/2022 | Mukherjee | F03D 1/0641 |

FOREIGN PATENT DOCUMENTS

| EP | 2434152 A2 | 3/2012 | |
| EP | 2742234 B1 * | 1/2018 | ........... F03D 1/0675 |

(Continued)

OTHER PUBLICATIONS

Machine Translation of EP 2,742,234, retrieved from ESPACENT on Jan. 4, 2023 (Year: 2023).*

(Continued)

*Primary Examiner* — Justin D S Eabe
*Assistant Examiner* — Sang K Kim
(74) *Attorney, Agent, or Firm* — Dority & Manning, P. A.

(57) ABSTRACT

The present invention relates to a wind turbine blade and a method for its manufacture. A lower shell part and an upper shell part are provided, each shell part having a leading edge and a trailing edge. A first shear web and a second shear web for connecting an inner surface of the lower shell part with an inner surface of the upper shell part are provided. The first shear web and the second shear web are connected by a first distance member in a chordwise direction. The first distance member is arranged for accommodating a variable chordwise distance between said first shear web and said second (Continued)

shear web. The first shear web and the second shear web are placed in the lower shell part and the upper shell part is mounted.

15 Claims, 6 Drawing Sheets

(58) Field of Classification Search
CPC .......... F05B 2230/608; F05B 2260/301; B29L 2031/085; B29C 65/4825
See application file for complete search history.

(56) References Cited

FOREIGN PATENT DOCUMENTS

WO     WO-2009135564 A2 * 11/2009 ........... F03D 1/0675
WO     WO2020/114564 A1     6/2020

OTHER PUBLICATIONS

Machine Translation of WO 2009/135564, retrieved from ESPACENT on Jan. 4, 2023 (Year: 2023).*
European Search Report Corresponding to EP21154219 dated Jul. 2, 2021.

* cited by examiner

DISTANCE MEMBER FOR CONNECTING WIND TURBINE BLADE SHEAR WEBS

FIELD OF THE INVENTION

The present invention relates to a method for manufacturing a wind turbine blade and to a wind turbine blade obtainable by said method.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Wind turbine blades of fibre-reinforced polymer are usually manufactured in moulds, where the pressure side and the suction side of the blade are manufactured separately by arranging glass fibre mats and/or other fibre-reinforcement material, such as carbon fibre, in each of the two mould parts. The two shell halves are usually glued together, wherein an adhesive is applied to the inner face of the lower blade half before the upper blade half is lowered thereon.

Spar caps or main laminates are placed or integrated in the shell halves and may be combined with shear webs or spar beams to form structural support members. Spar caps or main laminates may be joined to, or integrated within, the inside of the suction and pressure halves of the shell. Thus, the shear webs are typically bonded to the inside of the lower blade half prior to adhering the upper blade half, usually by means of upper and lower mounting flanges arranged at both ends of the shear web, arranged perpendicular to the web body. An adhesive such as epoxy is applied along these mounting flanges for bonding the shear webs to the respective shell half.

However, one of the challenges involved in this approach is the provision of an accurate amount of adhesive between the flanges and the shell half. Too little adhesive may compromise the strength of the bond, whereas too much adhesive will create an overly thick bond line. In addition, the shear webs may move slightly when closing the mould, i.e. when fastening the upper shell half to the lower shell half.

Another concern in this process is obtaining a uniform adhesive thickness between the shear web mounting flanges and the inner surface of the shell, for example a uniform bond thickness of about 1 to 10 mm. In view of ever-increasing blade sizes, achieving such bond thickness can be difficult, owing to tolerance overlaps of shell and web moulds, components, and to the effect of shell repairs. Moreover, with blades and blade components getting bigger, it becomes more difficult to obtain a full control of the shear web movement: Hence, the final arrangement of shear web is challenging, and a full control of the final web bond line thickness remains elusive.

In addition, the quality and outcome of the blade bonding process is dependent on the geometry and tolerances of each blade components. Depending on mould supply, raw material supply, numbers of repairs and many other factors defining how accurate the blade components such as shells, webs, and the like align and fit, each blade is different from the other. Thus, each combination of shell and shear web is unique in terms of gap distribution. Moreover, there is a manual process variation that implies significant variation from one blade to another on the same mould, if all other factors are considered constant.

It is therefore an object of the present invention to provide a wind turbine blade with uniform adhesive thickness between the shear webs the blade shell.

It is another object of the present invention to provide a method of manufacturing a wind turbine blade which also an improved process control in terms of adhesive bonds between the shear webs and the inner shell surface.

It is another object of the present invention to provide a more efficient and more cost-effective method of manufacturing a wind turbine blade.

It is another object of the present invention to provide an improved method of manufacturing a wind turbine blade, wherein assembling of the wind turbine blade is facilitated and the amount of adhesive being needed is reduced.

It is another object of the present invention to provide a wind turbine blade having shear webs, and wherein these shear webs are aligned between the shell parts with a high accuracy.

SUMMARY OF THE INVENTION

It has been found that one or more of the aforementioned objects can be obtained by a method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, wherein the method comprises: providing a suction side shell half and a pressure side shell half, providing a first shear web and a second shear web, arranging the first shear web and the second shear web in between an inner surface of the suction side shell half and an inner surface of the pressure side shell half, and adhesively joining the first shear web and the second shear web to the inner surface of the suction side shell half and to the inner surface of the pressure side shell half at respective upper and lower adhesive joints, and adhesively joining the suction side shell half and a pressure side shell half along respective bond lines at said leading and trailing edges, wherein the first shear web and the second shear web are connected by a first distance member extending in a chordwise direction, wherein the first distance member is arranged for accommodating a variable chordwise distance between said first shear web and said second shear web.

The respective upper and lower adhesive joints are typically formed between the respective inner surface of the shell half and the respective shear web, usually the mounting flange of the shear web, by applying adhesive to these surfaces and then applying pressure. It was found that the method of the present invention allows for an improved alignment of these bonding surface due to allowing the shear webs to move towards each other when closing the blade. It was also found that this approach yields thinner bond lines and to a more constant bond line thickness between the shear webs and the inner surface of the shell halves.

By providing the variable chordwise distance between the first and second shear webs, these can be made to most optimum fit into the inner portion of the wind turbine blade, i.e. between the lower and the upper shell parts. Due to the variable chordwise distance being provided, also higher tolerances as to the length dimensions and shapes of the elements used, namely of the inner surfaces of the lower shell part and the upper shell part, and as well as to the shear web parts themselves are possible. By providing the variable chordwise distance one can avoid excessive sliding of the webs, which in turn would risk that the adhesive is misplaced compared to the web mounting flanges. Also, since flexibility is introduced the risk of damaging the webs is reduced in case the assembly fits too tight during blade closure.

Each shear web typically has a web body arranged in between two opposing web foots comprising the opposing mounting flanges of the shear web. The opposing side surfaces of the shear web usually extend in a substantially spanwise direction when the shear web is arranged within the blade. The first and the second shear web are preferably already connected by the first distance member, and optionally by the second distance member, when being arranged in the shell half. The first and the second shear webs may be a forward shear web and an aft shear web, wherein the forward shear web is arranged closer to the leading edge of the blade and the aft shear web is arranged closer to the trailing edge of the blade.

The pressure side shell half is also referred to as upwind side shell half. The suction side shell half is also referred to as downwind side shell half. These shell halves can also be referred to as upper and lower shell halves, in particular when closing the shell halves during the manufacturing process. The step of arranging the first shear web and the second shear web in between an inner surface of the suction side shell half and an inner surface of the pressure side shell half, is typically carried out by first arranging the shear webs within one of the shell halves and bonding the shear webs to the inner surface of said shell half. Then, usually the other shell half is arranged on, and bonded to, the opposing ends of the shear webs and bonded to the first shell half. Usually, the bonding to the shear web and to the first shell half are carried out simultaneously, when closing the blade.

In a preferred embodiment, the step of adhesively joining the first shear web and the second shear web to the inner surface of the suction side shell half and to the inner surface of the pressure side shell half at respective upper and lower adhesive joints, and adhesively joining the suction side shell half and a pressure side shell half along respective bond lines at said leading and trailing edges, comprises placing the suction side shell half on the pressure side shell half, or vice versa, for closing the shell. It is particularly preferred that this closing step effects chordwise movement of the shear webs towards each other. Thus, the shear webs can be optimally aligned with respect to the inner surfaces of the shell, thus providing optimized bonding.

It is preferred that the distance member comprises an elongate, substantially linear member, for example a bar or rod comprising a rubber damper or a coil spring, preferably a non-metallic coil spring to avoid interference with a lightning protection system of the blade. Advantageously, the distance member has a longitudinal axis that is substantially aligned with the chordwise direction of the blade. Typically, the longitudinal axis of the distance member is substantially perpendicular to a side surface of the shear web. In a preferred embodiment, the distance member is compressible in its longitudinal direction. In a particularly preferred embodiment, the distance member comprises a compression coil spring, preferably a non-metallic compression coil spring.

In a preferred embodiment, the distance member has a first end that is fixed to the first shear web and a second end that is fixed to the second shear web. In some embodiments, the distance member comprises a rod or bolt that enters and/or penetrates the web body of the respective shear web. Advantageously, the distance member is not directly connected to the shell halves.

The first shear web and the second shear web are connected by the distance member(s) extending in a chordwise direction, wherein the distance member is preferably arranged between a side surface of the first shear web and a side surface of the second shear web, said side surfaces facing each other. It is preferred that the distance member(s) remains in place in between the first and second shear web during the entire manufacturing method and also in the final blade. Thus, the distance member(s) advantageously become part of the wind turbine blade.

The first distance member, and optionally the second distance member, is arranged for accommodating a variable chordwise distance between said first shear web and said second shear web. It is preferred that the distance member is arranged for allowing the shear webs to move closer to each other in the chordwise direction, for example when applying pressure to one or both of the shear webs.

In a preferred embodiment, the distance member comprises one or more stay bolts and a spring. The stay bolt(s) may be threaded and used as a stay to connect opposite plates between which the spring is arranged, the spring load forcing plates apart. Such arrangement would allow the shear webs, connected on either side of the distance member, to move towards each other by applying force, e.g. when arranging one shell half on the other shell half.

As is most common, the present method as well includes applying of an adhesive to close the blade. By the arrangement of the shear web of the manner defined in the claims, less of such adhesive is needed, leading to a considerable reduction of the prices of wind turbine blades in total. An adhesive of the same or of a different kind can as well be applied on the flanges of the first and the second shear web and the method then includes such applying of the adhesive and the bonding of the flanges with the upper and the lower shell part. This assists in providing a durable wind turbine blade.

In preferred embodiment, the first shear web and the second shear web are connected by a second distance member extending in a chordwise direction, wherein the second distance member is arranged for accommodating a variable chordwise distance between said first shear web and said second shear web, the second distance member being spaced apart from the first distance member in a flapwise direction. The second distance member still further enhances the flexibility as to tolerances in the dimensions of the lower and upper shell parts, of the shear web itself, and as to variations in the mounting process, namely as to the direction into which the upper shell part is moved when being mounted to the lower shell part.

In preferred embodiment, the step of adhesively joining the suction side shell half and a pressure side shell half along respective bond lines at said leading and trailing edges comprises applying a closing pressure to at least one of the shell halves, wherein said closing pressure effects a chordwise movement of at least part of the first shear web toward at least part of the second shear web. This best fits to the general concave shape of the lower shell part and the upper shell part, enhancing the overall stability.

In preferred embodiment, the distance member is an elastic member, preferably comprising a spring. In preferred embodiment, the distance member is a telescopic rod. Thus, in one embodiment, the distance member comprises an elastic member. Such elastic member can specifically be provided as a spring, preferably non-metallic, in particular a coil spring. A rubber damper or an elastic foam block, and the like, could as well be used. In one embodiment, the distance member preferably is composed of a first part in which a second part slides, i.e. of telescopic shape. In the case it is provided as a telescopic rod, the embodiment is most reliable and stable.

In preferred embodiment, the first and the second distance members are connected to each other with a stabilizer, the stabilizer preferably being a torsion spring. This still further enhances the stability of the bond the two shell parts. Since depending on the forces which are applied to the shear webs and the individual tolerances of the components, an unwanted chordwise length difference between the upper and the lower side of the shear web might occur, a stabilizer can connect the first and second distance members. The stabilizer reduced the tilt of the shear webs towards each other. The stabilizer might be embodied as a torsion spring being connected with the shear web and the adjacent ends of the distance members. The stabilizer may comprise a material with some elastic stiffness and compliant.

In preferred embodiment, each of the first and second shear webs comprises two opposing mounting flanges, and wherein the step of adhesively joining the first shear web and the second shear web to the suction side shell half and to the pressure side shell half at respective upper and lower adhesive joints comprises applying an adhesive to said mounting flanges.

In preferred embodiment, each of the first and second shear webs comprises two opposing mounting flanges, and wherein the chordwise movement of at least part of the first shear web toward at least part of the second shear web results in an alignment of at least one of the mounting flanges of the shear webs with respect to an inclination of the inner surface of the suction side shell half or of the inner surface of the pressure side shell half. In a preferred embodiment, the closing of the shell halves results in a chordwise movement of the shear webs toward each such that an angle between a respective mounting flange of the shear web and the inner surface of the respective shell half is minimized. Thus, it is preferred that the chordwise movement of the shear web is such that the respective mounting flange of the shear web and the inner surface of the respective shell half are substantially parallel. This was found to improve the quality and strength of the bond.

In preferred embodiment, each of the first and second shear webs comprises two opposing mounting flanges, and wherein distance plugs are inserted between the mounting flanges of said first and second shear web and the inner surfaces of the shell halves. The plugs are useful in achieving constant bond line thicknesses along the web bond line. It is preferred that the plugs have a predefined thickness and the plugs are pre-bonded onto the web mounting flange. In the method, preferably the chordwise movement of at least part of the first shear web towards at least part of the second shear web results in an alignment of at least one flange of the upper and/or said lower shear web according to an inclination of the inner surface of the upper shell part and/or the lower shell part. The flange thus assists in achieving a stable construction. This is specifically even more the case when distance plugs are inserted between the flanges of said first and second shear web and the inner surfaces of the shell parts, the distance plugs providing a further degree of freedom and consequently a higher flexibility as to dimensional tolerances. The distance plugs have the function of ensuring that the lower bondline thickness limit is not exceeded. The distance plugs might be formed as solid piece or block of material. In some embodiments, the distance plugs take the form of one or more knobs or one or more ledges.

In another aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, the blade comprising a suction side shell half and a pressure side shell half, wherein the suction side shell half and a pressure side shell half are adhesively joined along respective bond lines at said leading and trailing edges, a first shear web and a second shear web arranged between an inner surface of the suction side shell half and an inner surface of the pressure side shell half, wherein the first shear web and the second shear web are adhesively joined to the inner surface of the suction side shell half and to the inner surface of the pressure side shell half at respective upper and lower adhesive joints, wherein the first shear web and the second shear web are connected by a first distance member extending in a chordwise direction, and wherein the first distance member is arranged for accommodating a variable chordwise distance between said first shear web and said second shear web.

By purposefully designing shear webs to match an upper tolerance height (i.e. oversized with respect to web build height), self-alignment or self-location of the shear webs during the blade bonding process is achieved where blade shells are bonded together with the shear webs.

Each shell half typically comprises a core, e.g. a polymer foam, which is laminated with glass and/or carbon fibre layers which are embedded in a polymer resin. The core may not extend through the entire length of the wind turbine blade, in particular, a tip end region may only comprise a fibre-reinforced laminate. The shell halves also usually comprises spar caps as part of their inner surfaces to which a mounting flange of a respective shear web can be adhered.

The blade shell halves typically form a cavity, wherein the at least one shear web is arranged in this cavity in order to connect the blade shell halves and to provide a structure with an increased shear resistance. Preferably, the first distance member comprises an elastic member, in particular a spring. Further preferably, the spring may be a coil spring or an elastic member being arranged between a first end and a second end of the first shear web. The elastic member allows for a compact construction of the shear web.

In a preferred embodiment, the distance member is compressible, preferably compressible in its longitudinal direction. It is particularly preferred that the distance member is arranged for accommodating a reduction in chordwise distance between said first shear web and said second shear web, typically by being compressed to a shorter length.

Preferably, the average thickness of adhesive between the respective inner surface of said shell halves and the respective mounting flange of said first and/or said second web shear is less than 20 mm, preferably less than 10 mm, most preferably less than 5 mm. Hence, a considerable price reduction of the overall wind blade is achieved due to a moderate consumption of adhesive.

The wind turbine blade preferably also comprises one or more distance plugs that are inserted between the respective mounting flange of the first and/or the second shear web and the respective inner surface of the upwind and/or downwind shell parts, the distance plugs extending through the entire thickness of a bond line between the mounting flange and the inner surface, thereby assisting in providing a reliable and durable bond.

In preferred embodiment, the first distance member comprises an elastic member, preferably comprising a spring, such as a coil spring. In preferred embodiment, the elastic member is arranged between a first end and a second end of said first shear web.

In preferred embodiment, said first shear web and said second shear web are coupled by a second distance member in a chordwise direction, wherein the second distance member is arranged for accommodating a variable chordwise distance between said first shear web and said second shear web, the second distance member being spaced apart from the first distance member in a flapwise direction, wherein said first and said second distance member are connected by a stabilizer, such as a torsion spring.

In preferred embodiment, the average thickness of an adhesive bond line between the inner surface of the suction side shell half or the pressure side shell half and the mounting flanges of said first and/or said second web shear is less than 8 mm, preferably less than 4 mm.

In preferred embodiment, one or more distance plugs are inserted between the mounting flanges of the first and/or said second shear web and the inner surfaces of the suction side shell half or the pressure side shell half, the distance plugs extending through the entire thickness of a bond line between the respective mounting flange and the respective inner surface of the shell half.

In another aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, the blade comprising a suction side shell half and a pressure side shell half, wherein the suction side shell half and the pressure side shell half are adhesively joined along respective bond lines at said leading and trailing edges, a first shear web and a second shear web arranged between an inner surface of the suction side shell half and an inner surface of the pressure side shell half, wherein the first shear web and the second shear web are adhesively joined to the inner surface of the suction side shell half and to the inner surface of the pressure side shell half at respective upper and lower adhesive joints, wherein the first shear web and the second shear web are connected by a compressible distance member extending in a chordwise direction.

It is preferred that the distance member is an elongate, substantially linear member, for example a bar or rod comprising a rubber damper or a coil spring.

Advantageously, the distance member has a longitudinal axis that is substantially aligned with the chordwise direction of the blade. Typically, the longitudinal axis of the distance member is substantially perpendicular to a side surface of the shear web. In a preferred embodiment, the distance member is compressible in its longitudinal direction. In a particularly preferred embodiment, the distance member comprises a compression coil spring.

In a preferred embodiment, the compressible distance member is arranged in between the first and the second shear web, extending substantially perpendicularly to a respective side surface of the shear webs. Advantageously, the compressible distance member is not directly connected to the shell halves.

In another aspect, the present invention relates to a wind turbine blade obtainable by the method of the present invention.

In another aspect, the present invention relates to a wind turbine, which comprises wind turbine blades as described above.

As used herein, the term "spanwise" is used to describe the orientation of an element along the blade from its root end to its tip end. In some embodiments, spanwise is the direction along the longitudinal axis and longitudinal extent of the wind turbine blade. The flapwise direction is substantially vertically or perpendicularly to the spanwise direction of the blade. The flapwise direction is transverse to both the chordwise direction and the longitudinal/spanwise direction.

All features and embodiments discussed above with respect to the method of manufacturing a wind turbine blade likewise apply to the wind turbine blade of the present invention and vice versa.

BRIEF DESCRIPTION OF THE FIGURES

Embodiments of the disclosure of the invention will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
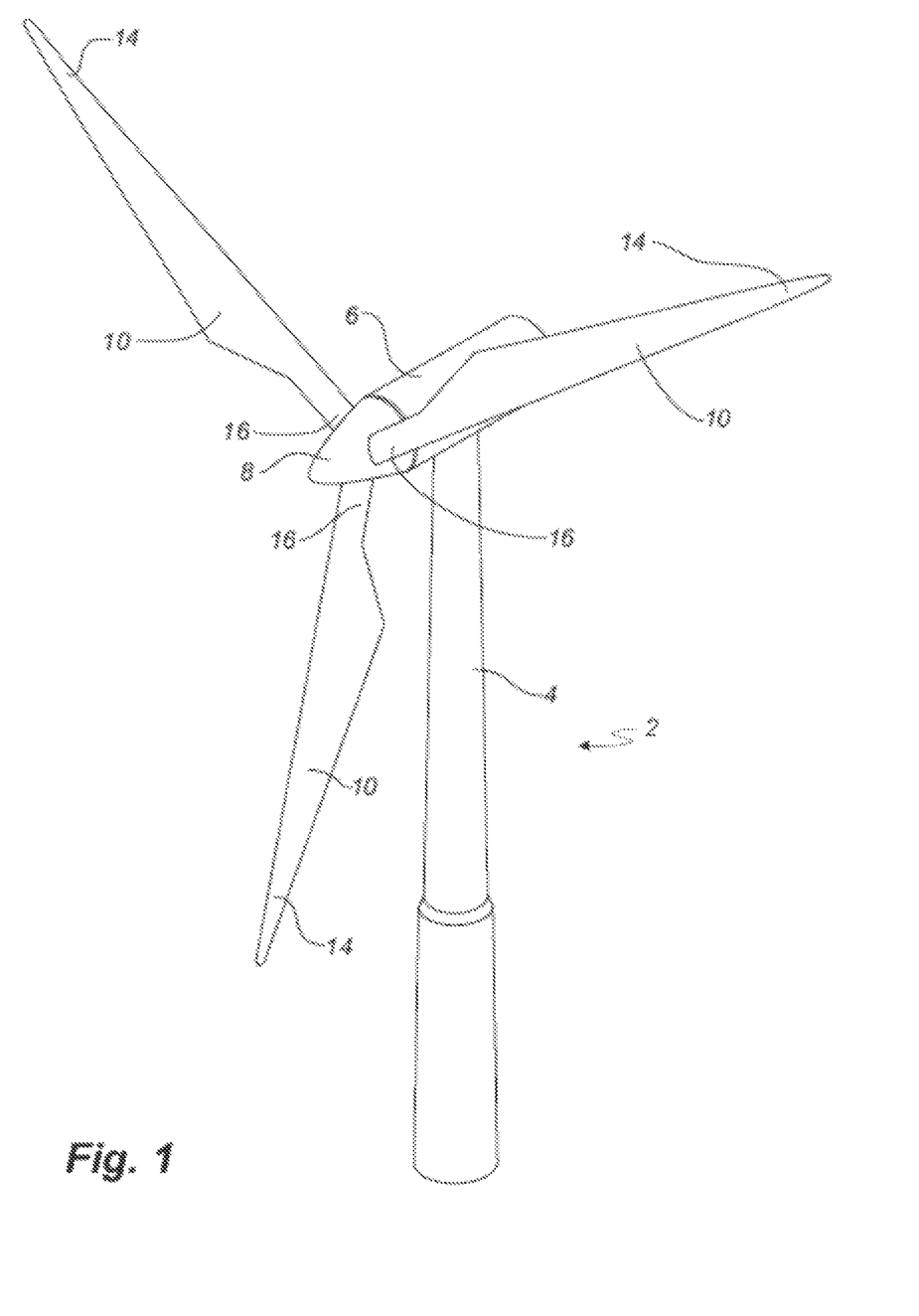
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
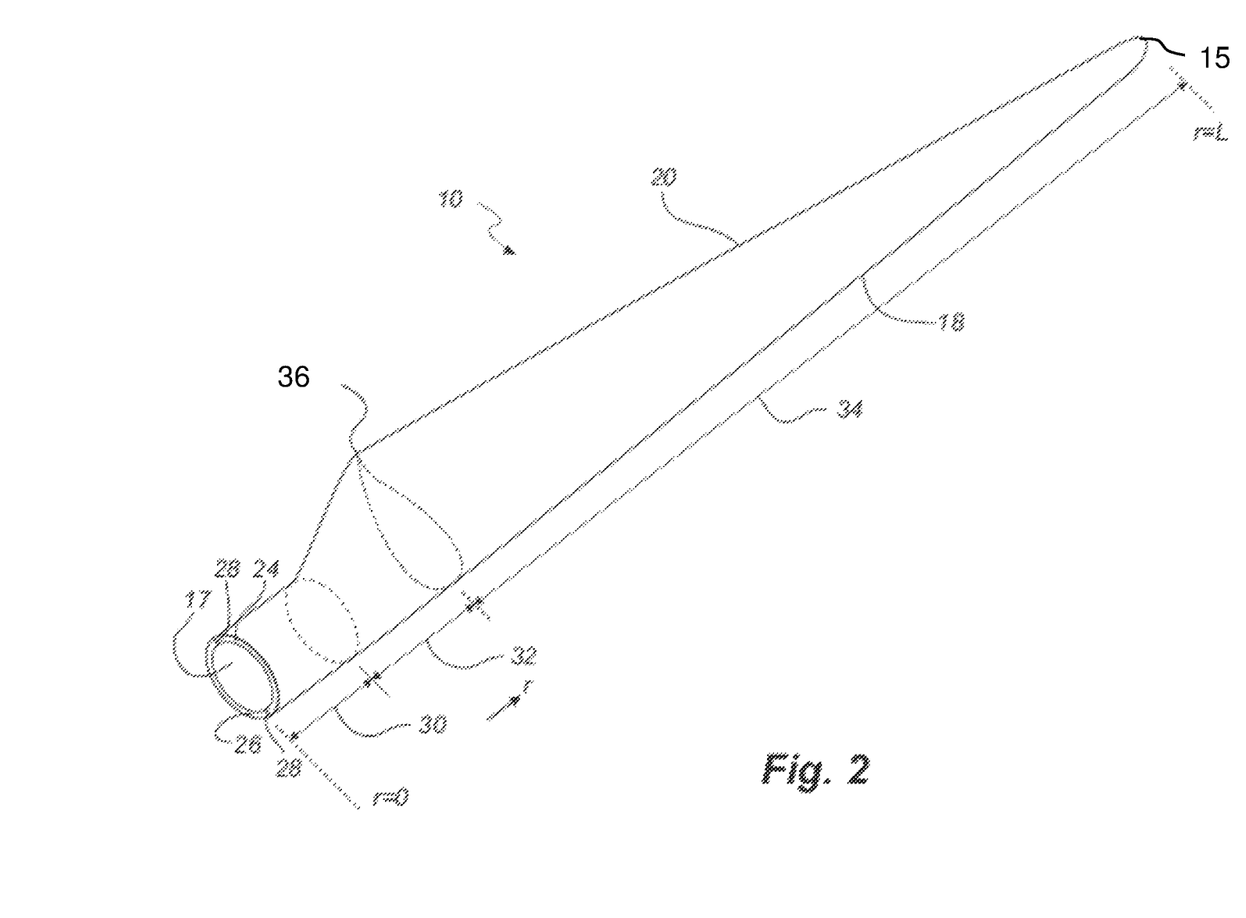
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 36 of the blade 10 is defined as the position, where the blade 10 has its largest chord length. The shoulder 36 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 have a semi-circular or semi-oval outer cross-sectional shape.

Figure 3:
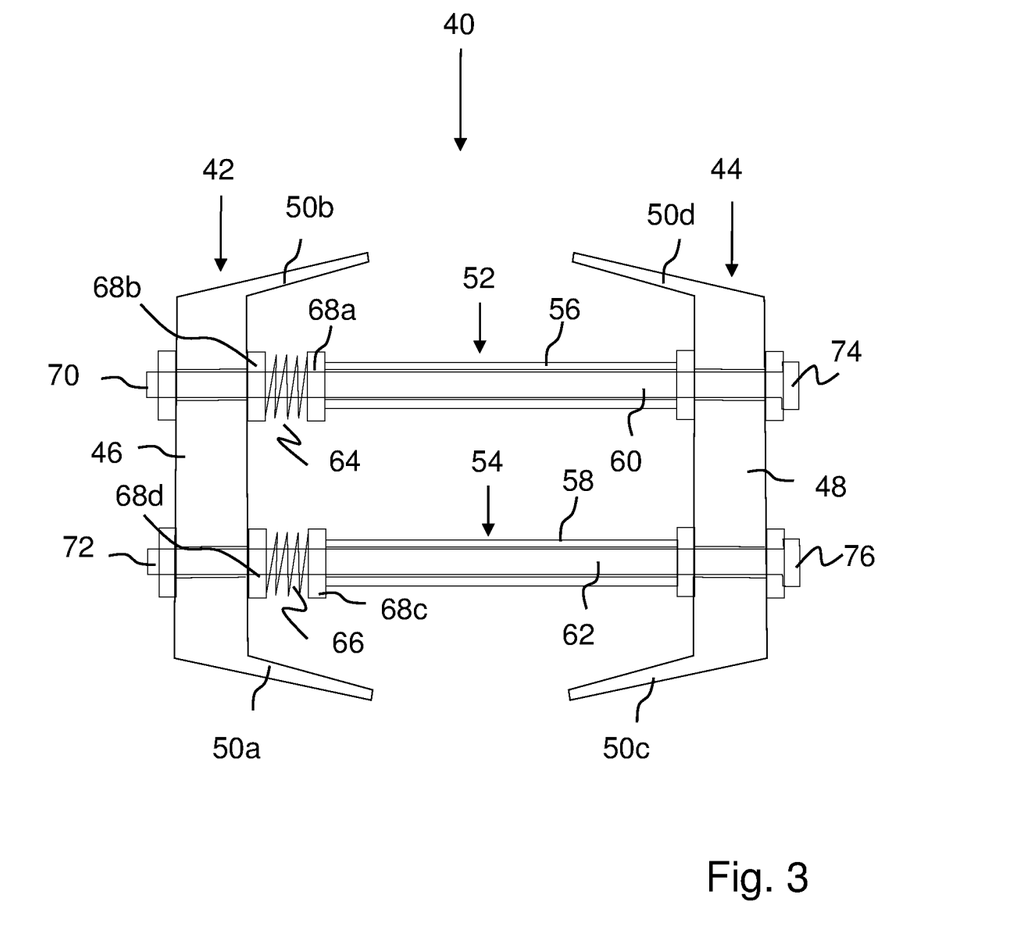
FIG. 3 shows a cross-sectional view of a shear web assembly as used in the present invention, having two distance members.

FIG. 3 shows a cross-sectional view of a preferred embodiment of a shear web assembly 40 as used in the method of manufacturing a wind turbine blade, and thus, in such wind turbine blade. The shear web assembly 40 includes a first shear web 42 and a second shear web 44, both of a general C-shape. Each of the first and second shear webs 42, 44 includes a main body 46, 48 and mounting flanges 50a, 50b, 50c, 50d in the shape of inclined tongues that are less thick than the main body 46, 48, but as well entirely stable. The shear webs are commonly produced of plastics material including fibre reinforced composites, e.g. with carbon fibres and/or glass fibres. For instance, as is the case with the first blade shell part 24 and the second blade shell part 26, they may be made out of a polymer foam, which is laminated with carbon and/or glass fibre layers that are embedded in a polymer resin.

Figure 4A:
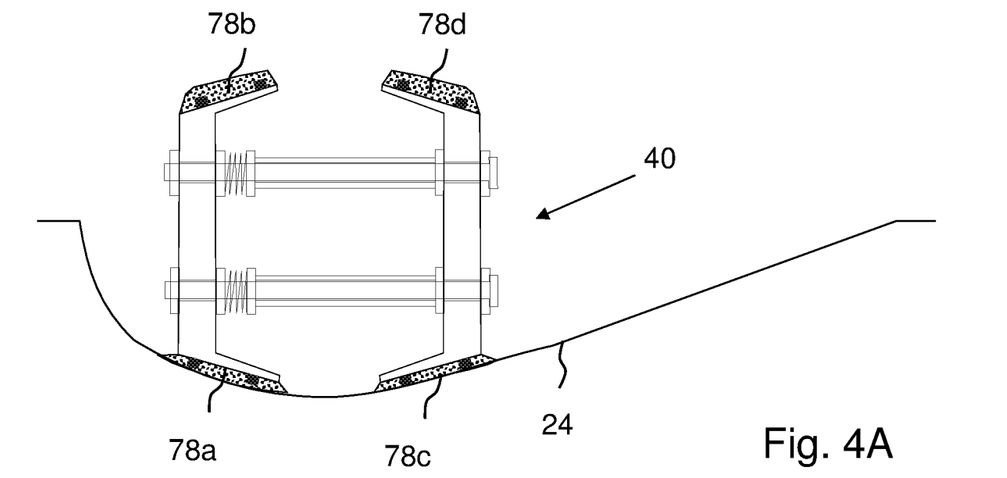
FIG. 4A, shows the shear web assembly of FIG. 3 as placed together with distance plugs in a lower shell part of a wind turbine blade.
Figure 4B:
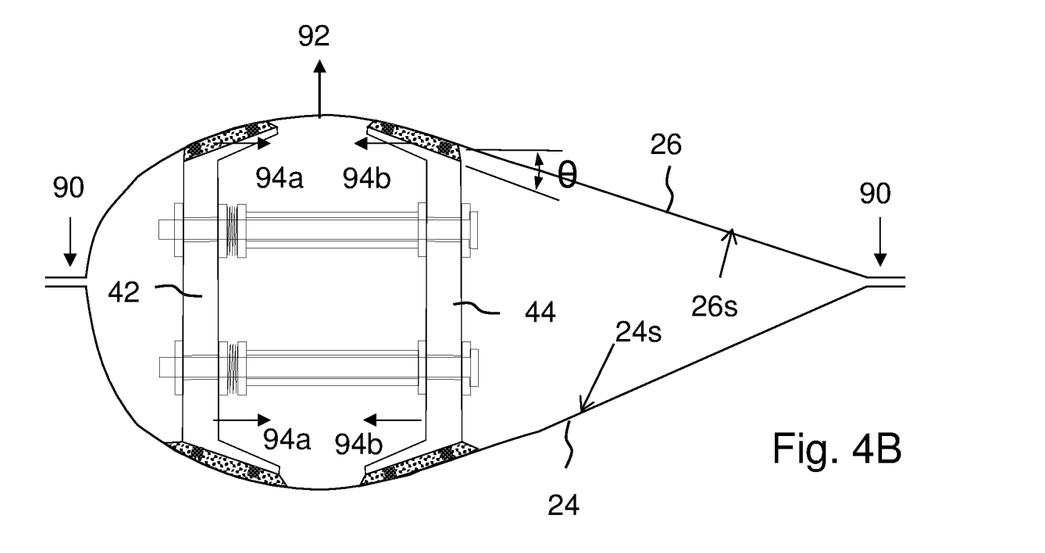
FIG. 4B shows the same situation with the upper shell part being placed on the shear web assembly.

The first shear web 42 and the second shear web 44 are coupled to each other (connected) by two distance members 52 and 54, the first distance member 52 in top of the second distance 54 member in a flap-wise direction of the wind turbine blade (see the arrow 92 in FIG. 4B). Each of the distance members 52, 54 is provided as a telescopic rod in an identical manner. Each telescopic rod includes an outer tube 56, 58 in which a rod 60, 62 is slidably engaged. The sliding movement is facilitated by a coil spring 64, 66, arranged between flanges 68a, 68b, 68c, 68d. The distance members 52, 54 are coupled to the respective first and second shear webs 42, 44 by suitable bolts 70, 72, 74, 76.

FIG. 4A illustrates a first assembling step and FIG. 4B a second assembling step by showing the wind turbine blade with the shear web assembly 40 in a cross-section. Before placing the shear web assembly 40 in a shell part of a wind turbine blade, distance plugs 78a, 78b, 78c, 78d are applied to the flanges 50a, 50b, 50c, 50d of the first and second shear webs 42, 44. Namely, they are pre-bonded onto these flanges. The such-equipped shear web assembly 40 is placed according to FIG. 4A in a lower shell part 24 for a wind turbine blade. Now the upper shell part 26 is, in line with arrows 90 in FIG. 4B, placed onto the lower shell part. There is an overall concave shape of the inner surface 26s and the inner surface 24s of the upper and lower shell parts 26, 24, see the small angle θ, θ being defined as being between 1.5° and 10°, preferably between 3° and 7°. Due to the respective local inclination of the surfaces 24s, 26s with respect to the distance plugs 78a, 78b, 78c, 78d, and the change in inclination in neighboured regions of the surfaces 24a, 26s, the two shear webs 42, 44 are pressed in a direction to each other (chordwise direction according to arrows 94a, 94b), and the respective rods 60, 62 move in the tubes 56, 58, leading to a compression of the springs 64, 66. Due to the variable chordwise distance (arrows 94a, 94b), the overall method is rather flexible in view of tolerances as to the dimensions of the individual parts, namely the lower and upper shell parts 24, 26, of the shapes of these parts, and of the direction 90 in which the upper shell part 26 is applied. By this, less adhesive is needed than elsewise.

Figure 5:
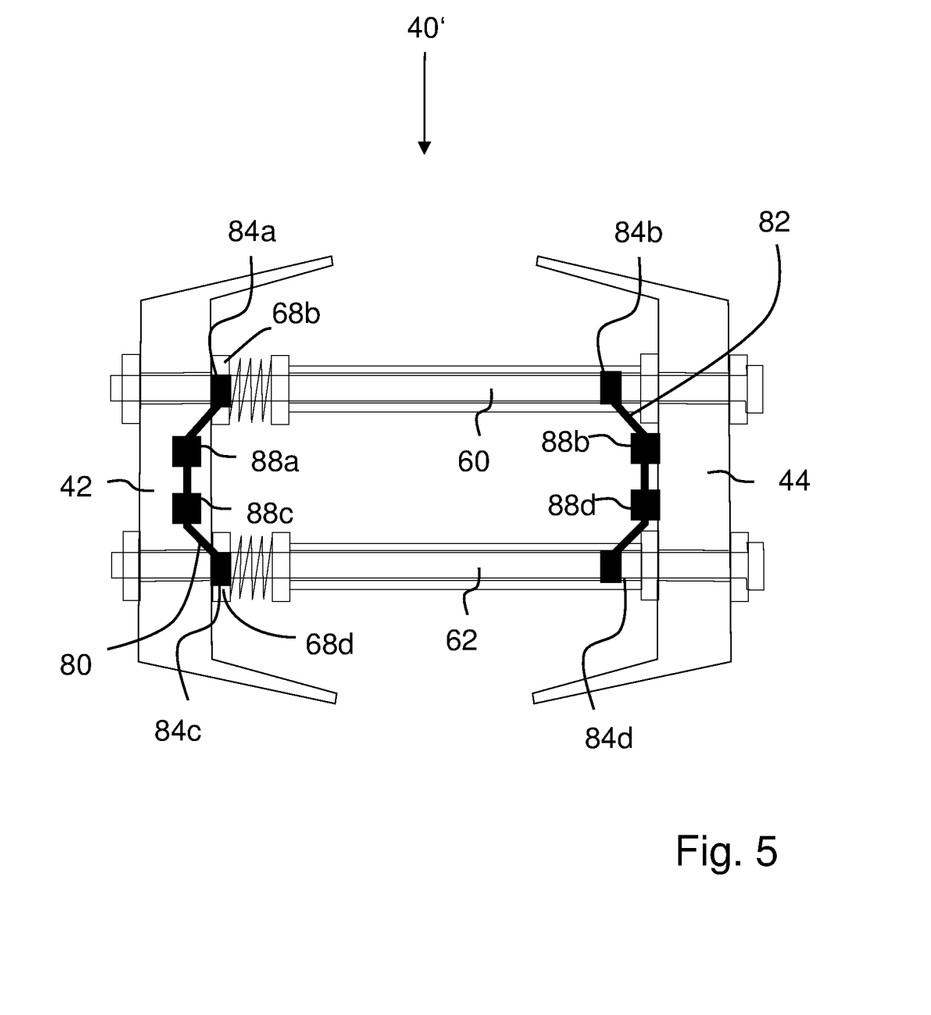
FIG. 5 shows a cross-sectional view of a preferred embodiment of the shear web assembly with stabilizers.

FIG. 5 is a schematic illustration of a modification of the assembly 40': Therein, the first and the second shear webs 42, 44 are each provided with a stabilizer 80, 82, wherein each stabilizer 80, 82 is connected with bearings at contact points 84a, 84b to the first distance member 52 and at 84c, 84d to the second distance member 54. Bearings 88a, 88b, 88c, 88d, in particular rubber bearings, connect the stabilizers 80, 82 with the shear webs 42, 44. The stabilizers 80, 82 act each as a torsion spring in a manner as to avoid a distortion of the shear web assembly 40', specifically a "nodding" of one or more of the flanges 50a, 50b, 50c, 50d.

Figure 6:
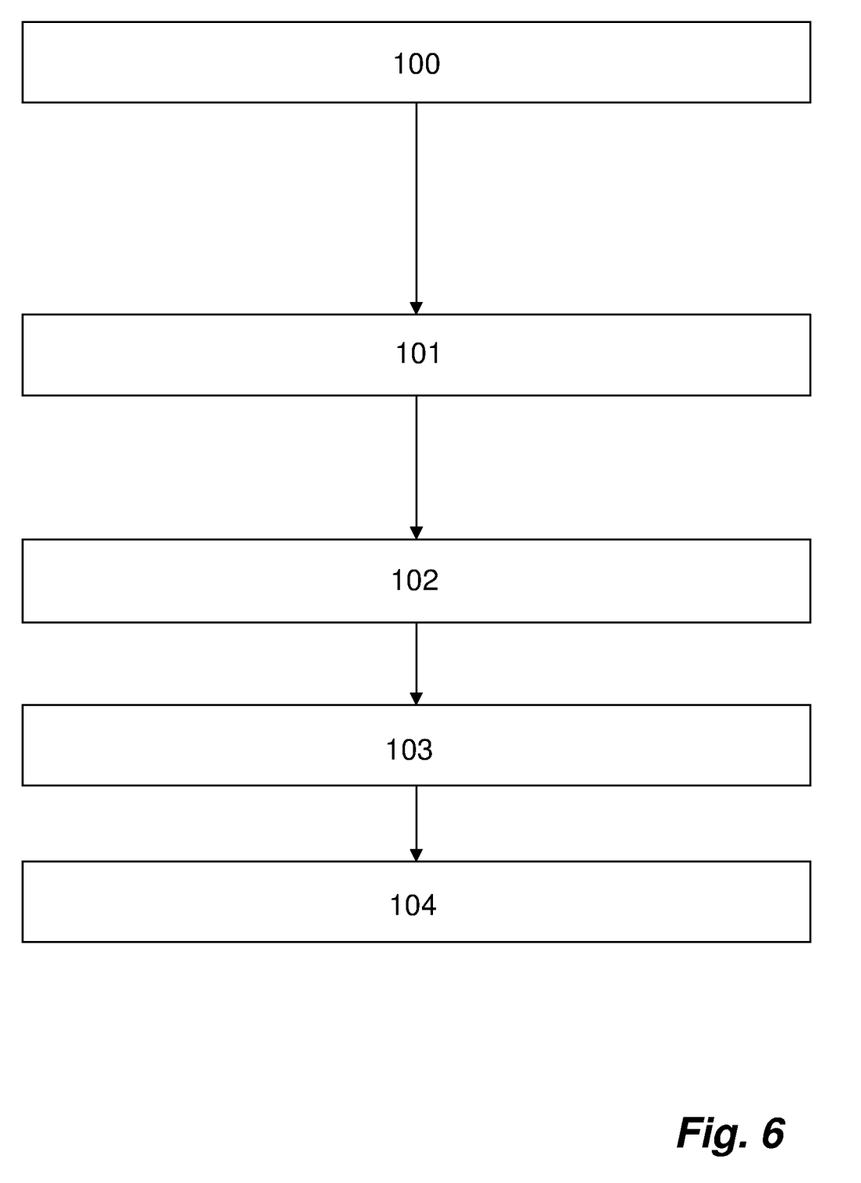
FIG. 6 is flowchart of an exemplary method for manufacturing a wind turbine blade.

FIG. 6 is a flowchart showing the steps of producing a wind turbine blade according to an embodiment of the invention. A lower shell part and an upper shell part are produced, each shell part having a leading edge end and a trailing edge end 100. The first shear web 42 and the second shear web 44 are manufactured separately 101, and the distance members 52, 54 are connected with the two webs 102. This assembly 40, which comprises the two shear webs 42, 44 and the two distance members 52, 54, is lifted into a lower shell part 24 (e.g. into the upwind side shell part), when the lower shell part is arranged in a mould 103.

Finally, the mould for combining the blade shell parts is closed 104. Due to the fact that the entire assembly with shear webs 42, 44 and distance members 52, 54 can be assembled offline and lifted as one component into the lower shell part, the manufacturing of the wind turbine blade is faster and easier to perform with a high accuracy.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
11 groove
14 blade tip
15 tip end
16 blade root
17 root end 18 leading edge
20 trailing edge
24 first/lower blade shell part (upwind/pressure side shell part)
24s inner surface
26 second/upper blade shell part (downwind/suction side part)
26s inner surface
30 root region
32 transition region
34 airfoil region
36 shoulder
40 shear web assembly
40' modification of the shear web assembly
42 first shear web
44 second shear web
46 main body
48 main body
50a, 50b, 50c, 50d flanges
52 distance member
54 distance member
56 outer tube
58 outer tube
60 rod
62 rod
64 coil spring
66 coil spring
68a, 68b, 68c, 68d flanges
70 bolt
72 bolt
74 bolt
76 bolt
78a, 78b, 78c, 78d plugs
80 stabilizer
82 stabilizer
84a, 84b, 84c, 84d contact points
88a, 88b, 88c, 88d bearings
90 arrow indicating direction
92 arrow indicating direction
94a, 94b arrows indicating direction
100 providing a lower shell part and an upper shell part, each shell part having a leading edge end and a trailing edge end
101 providing a first shear web and a second shear web
102 connecting the first shear web and the second shear web by distance members
103 lifting the assembly, which comprises the first shear web and the second shear web coupled by distance members
104 closing the mould in order to combine the shell parts
θ angle

The invention claimed is:

1. A method of manufacturing a wind turbine blade having a profiled contour including a pressure side, a suction side, a leading edge, a trailing edge, and a chord having a chord length extending between the leading edge and the trailing edge, the wind turbine blade extending in a spanwise direction between a root end and a tip end, wherein the method comprises:
   providing a suction side shell half and a pressure side shell half;
   providing a first shear web and a second shear web;
   arranging the first shear web and the second shear web in between an inner surface of the suction side shell half and an inner surface of the pressure side shell half;
   adhesively joining the first shear web and the second shear web to the inner surface of the suction side shell half and to the inner surface of the pressure side shell half at respective upper and lower adhesive joints, and adhesively joining the suction side shell half and the pressure side shell half along respective bond lines at the leading and trailing edges; and
   wherein the first shear web and the second shear web are connected by a first distance member extending in a chordwise direction, wherein the first distance member is arranged for accommodating a variable chordwise distance between the first shear web and the second shear web.

2. The method according to claim 1, wherein the first shear web and the second shear web are connected by a second distance member extending in a chordwise direction, wherein the second distance member is arranged for accommodating a variable chordwise distance between the first shear web and the second shear web, the second distance member being spaced apart from the first distance member in a flap-wise direction.

3. The method according to claim 2, wherein the first and the second distance members are connected to each other with a stabilizer.

4. The method according to claim 1, wherein the step of adhesively joining the suction side shell half and the pressure side shell half along respective bond lines at the leading and trailing edges comprises applying a closing pressure to at least one of the shell halves, wherein the closing pressure effects a chordwise movement of at least part of the first shear web toward at least part of the second shear web.

5. The method according to claim 1, wherein the first distance member comprises an elastic member.

6. The method according to claim 1, wherein the first distance member comprises a telescopic rod.

7. The method according to claim 1, wherein each of the first and second shear webs comprises two opposing mounting flanges, and wherein the step of adhesively joining the first shear web and the second shear web to the suction side shell half and to the pressure side shell half at respective upper and lower adhesive joints comprises applying an adhesive to the mounting flanges.

8. The method according to claim 7, wherein chordwise movement of at least part of the first shear web toward at least part of the second shear web results in an alignment of at least one of the mounting flanges of the shear webs with respect to an inclination of the inner surface of the suction side shell half or of the inner surface of the pressure side shell half.

9. The method according to claim 7, wherein distance plugs are inserted between the mounting flanges of the first and the second shear web and the inner surfaces of the shell halves.

10. A wind turbine blade, comprising:
   a profiled contour including a pressure side and a suction side, a leading edge and a trailing edge, and a chord having a chord length extending between the leading edge and the trailing edge;
   a root end and a tip end, the wind turbine blade extending in a spanwise direction between the root end and the tip end;
   a suction side shell half and a pressure side shell half, wherein the suction side shell half and the pressure side shell half are adhesively joined along respective bond lines at the leading and trailing edges;
   a first shear web and a second shear web arranged between an inner surface of the suction side shell half and an inner surface of the pressure side shell half, wherein the first shear web and the second shear web are adhesively joined to the inner surface of the suction side shell half and to the inner surface of the pressure side shell half at respective upper and lower adhesive joints; and the first shear web and the second shear web connected by a first distance member extending in a chordwise direction, the first distance member arranged for accommodating a variable chordwise distance between the first shear web and the second shear web.

11. The wind turbine blade according to claim 10, wherein the first distance member is an elastic member.

12. The wind turbine blade according to claim 11, wherein the elastic member is arranged between a first end and a second end of the first shear web.

13. The wind turbine blade according to claim 11, wherein the first shear web and the second shear web are coupled by a second distance member in a chordwise direction, the second distance member arranged for accommodating a variable chordwise distance between the first shear web and the second shear web, the second distance member spaced apart from the first distance member in a flap-wise direction, and the first and second distance members connected by a stabilizer.

14. The wind turbine blade according to 10, wherein each of the first and second shear webs comprises two opposing mounting flanges, and wherein a chordwise movement of at least part of the first shear web toward at least part of the second shear web results in an alignment of at least one of the mounting flanges of the shear webs with respect to an inclination of the inner surface of the suction side shell half or of the inner surface of the pressure side shell half.

15. The wind turbine blade according to claim 14, wherein one or more distance plugs are inserted between the mounting flanges of one or both of the first and second shear webs and the inner surfaces of the suction side shell half or the pressure side shell half, the distance plugs extending through an entire thickness of a bond line between the respective mounting flange and the respective inner surface of the shell half.

* * * * *